(12) United States Patent
Pawar et al.

(10) Patent No.: US 11,553,501 B1
(45) Date of Patent: *Jan. 10, 2023

(54) DYNAMIC CONTROL OF UPLINK CARRIER AGGREGATION IN A WIRELESS COMMUNICATION SYSTEM BASED ON SPECTRAL EFFICIENCY

(71) Applicant: Sprint Spectrum L.P., Overland Park, KS (US)

(72) Inventors: Hemanth B. Pawar, Brambleton, VA (US); Krishna Sitaram, Chantilly, VA (US); Shilpa K. Srinivas, Brambleton, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 87 days.

This patent is subject to a terminal disclaimer.

(21) Appl. No.: 15/929,159

(22) Filed: Nov. 8, 2019

(51) Int. Cl.
*H04W 72/08* (2009.01)
*H04W 24/10* (2009.01)
*H04W 16/32* (2009.01)

(52) U.S. Cl.
CPC ......... *H04W 72/085* (2013.01); *H04W 16/32* (2013.01); *H04W 24/10* (2013.01)

(58) Field of Classification Search
CPC ........... H04W 36/0069; H04W 72/085; H04W 16/32; H04W 28/0231; H04W 28/0236; H04W 28/06; H04W 28/0967; H04W 28/16; H04W 28/24; H04W 36/0044; H04W 36/30; H04W 40/12; H04W 52/241; H04W 52/26; H04W 52/265; H04W 72/08; H04W 72/1226; H04W 72/1231; H04W 72/1236
See application file for complete search history.

(56) References Cited

U.S. PATENT DOCUMENTS

| | | | |
|---|---|---|---|
| 9,473,286 B1 * | 10/2016 | Shipley | H04L 5/001 |
| 9,585,072 B1 | 2/2017 | Liu et al. | |
| 10,064,166 B1 | 8/2018 | Liu et al. | |
| 2008/0261645 A1 * | 10/2008 | Luo | H04W 52/362 455/522 |
| 2015/0327198 A1 | 11/2015 | Axmon et al. | |
| 2019/0261424 A1 | 8/2019 | Park et al. | |
| 2020/0163142 A1 * | 5/2020 | Ryoo | H04W 24/10 |
| 2020/0245413 A1 * | 7/2020 | Gambini | H04W 72/0453 |

FOREIGN PATENT DOCUMENTS

CN          101848532          9/2010

* cited by examiner

*Primary Examiner* — Mohammed S Chowdhury (57) ABSTRACT

A method and system for controlling wireless service of a user equipment device (UE) by an access node. The access node serves the UE with uplink carrier-aggregation over a connection that encompasses multiple uplink channels including a primary uplink channel (uplink PCell) and a secondary uplink channel (uplink SCell). Further, the access node dynamically sets a channel-quality threshold (e.g., an RSRP threshold) applicable to control when to deconfigure the uplink SCell from service of the UE, with the dynamically setting of the channel-quality threshold including iteratively adjusting the channel-quality threshold based on uplink spectral efficiency of the access node. And the access node applies the dynamically set channel-quality threshold to control when to deconfigure the uplink SCell from service of the UE.

17 Claims, 6 Drawing Sheets

DYNAMIC CONTROL OF UPLINK CARRIER AGGREGATION IN A WIRELESS COMMUNICATION SYSTEM BASED ON SPECTRAL EFFICIENCY

BACKGROUND

A wireless communication system typically includes a number of access nodes that are configured to provide wireless coverage areas in which user equipment devices (UEs) such as cell phones, tablet computers, tracking devices, embedded wireless modules, and other wirelessly equipped communication devices (whether or not user operated), can operate. Further, each access node could be coupled with a core network that provides connectivity with one or more transport networks, such as the public switched telephone network (PSTN) and/or the Internet for instance. With this arrangement, a UE within coverage of the system could engage in air interface communication with an access node and could thereby communicate via the access node with various remote network entities or with other UEs served by the access node.

Such a system could operate in accordance with a particular radio access technology, with air-interface communications from the access nodes to UEs defining a downlink or forward link and air-interface communications from the UEs to the access nodes defining an uplink or reverse link.

Over the years, the industry has developed various generations of radio access technologies, in a continuous effort to increase available data rate and quality of service for end users. These generations have ranged from "1G," which used simple analog frequency modulation to facilitate basic voice-call service, to "4G"—such as Long Term Evolution (LTE), which facilitates mobile broadband service using technologies such as orthogonal frequency division multiplexing (OFDM) and multiple input multiple output (MIMO). And most recently, the industry is now exploring developments in "5G" and particularly "5G NR" (5G New Radio), which may use a scalable OFDM air interface, advanced channel coding, massive-MIMO, beamforming, and/or other features, to support higher data rates and countless applications, such as mission-critical services, enhanced mobile broadband, and massive Internet of Things (IoT).

In accordance with the radio access technology, each access node could be configured to provide service on one or more carrier frequencies or "carriers." Each carrier could be frequency division duplex (FDD), defining separate frequency channels for downlink and uplink communication, or time division duplex (TDD), defining a single frequency channel multiplexed over time between downlink and uplink use. Further, each frequency channel of a carrier could occupy a particular frequency bandwidth defining a range of frequency at a particular position (e.g., defined by a center frequency or low-end and high-end frequencies) in radio-frequency spectrum.

On the downlink and uplink, each carrier could be structured to define various physical resources and channels for carrying information between the access nodes and UEs.

In an example configuration for instance, the air interface could be divided over time into frames, subframes, and symbol time segments, and the carrier bandwidth could be divided over frequency into subcarriers, so that the air interface would define an array of resource elements each occupying one subcarrier and one symbol time segment. With this example configuration, the resource elements could be grouped within each subframe to define physical resource blocks (PRBs) in which the subcarriers can be modulated to carry data.

Further, certain resource elements or PRBs could be reserved for use to carry particular types of data, such as control signaling and/or user-plane communications.

For instance, in each downlink subframe, the resource elements in the first symbol time segments could be generally reserved to define a control region for carrying control signaling such as PRB-scheduling directives from the access node to UEs, and the resource elements in the remaining symbol time segments could be generally reserved to define a downlink shared traffic channel in which PRBs could be used to carry data from the access node to UEs. Further, other resource elements could be reserved for other purposes. For instance, resource elements distributed throughout each downlink subframe could be reserved to carry a reference signal from the access node that UEs could measure as a basis to gauge coverage strength.

And in each uplink subframe, certain PRBs at the low-frequency end of the carrier bandwidth and at the high-frequency end of the carrier bandwidth could be generally reserved to define a control region for carrying control signaling such as uplink scheduling requests from UEs to the access node, and other PRBs could be generally reserved to define an uplink shared channel in which PRBs could be used to carry data from UEs to the access node.

OVERVIEW

When a UE enters into coverage of an access node under in an example system, the UE could discover threshold strong coverage on one of the access node's carriers, and the UE could then responsively engage in signaling to connect with the access node on that carrier, such as to establish a Radio Resource Control (RRC) connection. Further, a core-network controller could then coordinate setup or transfer of one or more user-plane bearers defining virtual packet tunnels for carrying user-plane data communications between the UE and a core-network gateway system that provides connectivity with a transport network such as the Internet. Each such bearer could include a data-radio bearer (DRB) tunnel that extends over the air between the UE and then access node and an access-bearer that extends within the core network between the access node and the gateway system.

Once the UE is so connected and has one or more established bearers, the access node could then serve the UE on the carrier, scheduling use of the carrier's PRBs as needed to carry communications to or from the UE.

For instance, when packet-data arrives at the access node for transmission to the UE, the access node could schedule use of certain downlink PRBs in subframe to carry a transport-block of that data to the UE, the access node could transmit to the UE in the control region of that subframe a scheduling directive (e.g., a Downlink Control Information (DCI) message) that specifies the PRBs that will carry the data, and the access node could transmit the data to the UE in those PRBs. And when the UE has packet-data to transmit to the access node, the UE could transmit to the access node a scheduling request including a buffer status report (BSR) indicating the quantity of data to be transmitted, the access node could schedule use of certain uplink PRBs in an upcoming subframe to carry a transport-block of that data from the UE and could transmit to the UE an advanced scheduling directive that specifies those PRBs, and the UE could then transmit the data to the access node in those PRBs.

For such scheduled downlink or uplink communication on PRBs, the access node and UE could use a modulation and coding scheme (MCS) that is selected based on the UE's wireless channel quality, which the access node could specify in its scheduling directive to the UE. In a representative implementation, the MCS could define a coding rate based on the extent of error-correction coding data or the like that would be transmitted together with the user-plane data being communicated, and a modulation scheme that establishes how many bits of data could be carried by each resource element. When channel quality is better, the access node may direct use of a higher-order MCS that has a higher coding rate (e.g., with more error-correction coding) and/or hat supports more bits per resource element, and when channel quality is worse, the access node may direct use of a lower-order MCS that may have a lower coding rate and/or supports fewer bits per resource element.

In practice, the access node could determine the MCS to be used use in a given instance based on wireless channel quality reported by the UE.

For instance, as the access node serves the UE, the UE could transmit channel quality reports to the access node periodically and/or as part of the UE's scheduling requests or other communications to the access node, with each report including a channel-quality indicator (CQI) value representing the UE's determined channel quality and perhaps one or more other channel metrics such as downlink reference signal receive power (RSRP), signal-to-noise-plus interference ratio (SINR), or the like. When the access node schedules communications to or from the UE, the access node could then map the UE's latest reported CQI value to a corresponding MCS value using a standard CQI-MCS mapping table, and the access node could direct use of that MCS in the scheduling directive that the access node sends to the UE. Communication could thus occur using that directed MCS.

In addition, for uplink communication, the access node might also base the determination of MCS on an evaluation of the UE's uplink transmission power, namely, the extent to which the UE is transmitting with sufficient power.

As the access node serves the UE, for instance, the access node and UE may engage in an uplink power-control process through which the access node directs the UE incrementally increase or decrease its transmission power in an effort to keep the uplink receive power at a desired level. But the UE may be limited to a maximum transmission power level. Therefore, the UE may have a level of power-headroom that defines the difference between (i) the transmission power that the UE should be using based on the power control process and (ii) the UE's maximum transmission power. A positive power-headroom value would mean that the UE has transmission power to spare and can increase its transmission power more if directed to do so, whereas a zero or negative power-headroom value would mean that the UE has already reached its maximum transmission power level and may be unable to transmit with sufficient power.

When the UE sends a scheduling request to the access node, the UE could include in the scheduling request a power-headroom report (PHR) indicating the UE's current power headroom. And the access node could use that reported power headroom as a basis to set or adjust the MCS that the access node will direct the UE to use for uplink transmission. If the power headroom is negative, for instance, the access node might artificially reduce the MCS-order from the MCS indicated by the UE's channel quality report. Use of a lower-order MCS might be more robust and better able to facilitate successful uplink communication with constrained uplink transmission power.

In practice, the uplink bandwidth of the carrier on which an access node serves a UE could pose an effective limit on the peak rate of data transmission from the UE to the access node, as the uplink bandwidth would contain only a limited number of PRBs per subframe or other transmission time interval (TTI), with the data rate per PRB being further limited based on the MCS set as discussed above for instance, and with the number of allocated PRBs being limited based on how many other UEs the access node is concurrently serving on that uplink channel.

One way to help overcome this uplink data rate limitation is to have the access node serve the UE with uplink carrier aggregation, by serving the UE on uplink channels of multiple carriers concurrently. To provide uplink carrier-aggregation service for the UE, the access node could add one or more additional carriers to the UE's connection with the access node, and the access node could then schedule uplink communication from the UE to occur concurrently on the uplink channels of the multiple carriers, with the UE transmitting some data on one or more PRBs of one carrier's uplink channel concurrently with transmitting other data on one or more PRBs of another carrier's uplink channel.

In a representative uplink carrier-aggregation scenario, the UE would be served on two carriers at once (as a "2CA" arrangement), with one carrier being deemed a primary carrier or primary cell (PCell) and the other being deemed a secondary carrier or secondary cell (SCell). The PCell could function as the anchor for certain control signaling related to the carrier-aggregation service, such as for scheduling requests and scheduling directives, and the SCell could function generally to supplement the UE's uplink bandwidth so as to help provide the UE with increased peak uplink data rate.

One technical problem that can occur with uplink carrier aggregation, however, is that the UE's limited uplink transmission power may strain the UE's ability to transmit concurrently on the uplink channels of the multiple component carriers. When the UE transmits concurrently on PRBs of multiple uplink channels, the UE may need to distribute its transmission power across those uplink channels, and so the UE's per-PRB transmission power may be relatively low. This could be especially problematic in a scenario where the UE has reached its maximum transmission power and is strained to transmit with sufficient power in the first place.

To help address this problem, the access node could apply an uplink-SCell-deconfiguration process by which, when the UE's reported channel quality becomes threshold low, the access node would automatically release the UE's SCell—possibly transitioning the UE from uplink-carrier-aggregation service to service on a single uplink channel. In particular, the access node could regularly evaluate the UE's reported channel quality (e.g., RSRP or CQI) as to the SCell specifically or cooperatively as to the multiple carriers on which the UE is served, and when the channel quality becomes at least as low as a threshold level, UL-SCell-Deconfig, the access node could drop the UE's uplink SCell from the UE's connection, so as to help alleviate the UE's uplink power distribution problem.

Unfortunately, however, a further technical problem with this process is that the access node may be preconfigured to apply a fixed UL-SCell-deconfig threshold that may not be optimal.

In practice, certain operational circumstances may benefit from the access node applying of a higher or lower UL-SCell-deconfig threshold.

By way of example, the type of communication in which the UE is engaged may justify application of a higher or lower UL-SCell-deconfig threshold. For instance, if the UE is engaged in relatively heavy uplink communication such as uplink video streaming, it may be useful to apply a lower UL-SCell-deconfig threshold in order to help maintain the UE's SCell longer (requiring worse reported channel quality before releasing the UE's uplink SCell) so that the UE could benefit more from the increased uplink peak data rate provided by the SCell. Whereas, if the UE is engaged in relatively light uplink communication such as web browsing traffic, it may be useful to apply a higher UL-SCell-deconfig threshold, to more readily release the UE's SCell so as to more readily address the uplink-power-distribution problem noted above.

As another example, the UE's maximum transmission power level may justify application of a higher or lower UL-SCell-deconfig threshold. A UE's maximum transmission power may be indicated by the UE's power class. For instance, a standard-power UE may have a maximum transmission power of 23 dBm, whereas a high-power UE may have a maximum transmission power of 26 dBm. If a UE has a lower maximum transmission power level, then it may be useful to apply a higher UL-SCell-deconfig threshold, since the UE may be more susceptible to the uplink-power-distribution problem noted above. Whereas, if a UE has a higher maximum transmission power level, then it may be useful to apply a lower UL-SCell-deconfig threshold, since the UE may be less susceptible to the uplink-power-distribution problem.

Further, a preconfigured UL-SCell-deconfig threshold may not be optimal in terms of the access node's uplink spectral efficiency. Uplink spectral efficiency of the access node is a measure of the quantity of data that the access node's uplink could carry per unit of frequency spectrum per unit time, possibly measured as a quantity of bits per Hertz per second across the multiple uplink carrier channels on which the access node is configured to operate. If the access node is configured to apply an UL-SCell-deconfig threshold that is too low, then the access node's served UEs may more often end up using a reduced-order MCS, and the access node may therefore generally have undesirably low spectral efficiency. If the access node's spectral efficiency is too low, then a provider of the access node may be compelled to add additional uplink spectrum to the access node, which may be expensive and therefore undesirable.

Disclosed herein is a technical solution to help address these problems. In accordance with the disclosure, an access node will dynamically vary the UL-SCell-deconfig threshold that the access node applies, with the dynamic varying being based upon operational circumstances and/or an evaluation of the access node's spectral efficiency.

In one respect, the access node could dynamically vary the UL-SCell-deconfig threshold that the access node applies, with the dynamic varying being based on operational circumstances such as the type of communication in which the UE is engaged and/or based on the UE's power class.

For example, the access node could determine if the UE is engaged in relatively heavy uplink communication or rather relatively light uplink communication, and the access node could select an UL-SCell-deconfig threshold based on that determination and could apply the selected UL-SCell-deconfig threshold to control whether and when to release an SCell from the UE's connection. If the UE is engaged in relatively heavy uplink communication rather than relatively light uplink communication, then the access node could select and apply a first UL-SCell-deconfig threshold rather than a second UL-SCell-deconfig threshold based on the first UL-SCell deconfig threshold being lower than the second UL-SCell-deconfig threshold. Whereas, if the UE is engaged in relatively light uplink communication rather than relatively heavy uplink communication, then the access node could select and apply the second UL-SCell-deconfig threshold rather than the first UL-SCell-deconfig threshold based on the second UL-SCell deconfig threshold being higher than the second UL-SCell-deconfig threshold.

Alternatively, the access node might generally be set to apply a default UL-SCell-deconfig threshold and may dynamically switch to apply an UL-SCell-deconfig threshold that is lower or higher than the default UL-SCell-deconfig threshold based on a determination of the type of communication in which the UE is engaged. For instance, if the UE is engaged in relatively heavy uplink communication, then the access node may responsively switch to apply an UL-SCell-deconfig threshold that is lower than the default UL-SCell-deconfig threshold. Whereas, if the UE is engaged in relatively light uplink communication, then the access node may responsively switch to apply an UL-SCell-deconfig threshold that is higher than the default UL-SCell-deconfig threshold.

As another example, the access node could determine the UE's power class, and the access node could select an UL-SCell-deconfig threshold based on the determined UE power class and could apply the selected UL-SCell-deconfig threshold to control whether and when to release an SCell from the UE's connection. If the UE is a high-power UE rather than a standard-power UE, then the access node could select and apply a first UL-SCell-deconfig threshold rather than a second UL-SCell-deconfig threshold based on the first UL-SCell deconfig threshold being lower than the second UL-SCell-deconfig threshold. Whereas, if the UE is a standard-power UE rather than a high-power UE, then the access node could select and apply the second UL-SCell-deconfig threshold rather than the first UL-SCell-deconfig threshold based on the second UL-SCell deconfig threshold being higher than the second UL-SCell-deconfig threshold.

Alternatively or additionally, the access node might generally be set to apply a default UL-SCell-deconfig threshold and may dynamically switch to apply an UL-SCell-deconfig threshold that is lower or higher than the default UL-SCell-deconfig threshold based on a determination of the UE's power class. For instance, if the UE is a high-power UE, then the access node may responsively switch to apply an UL-SCell-deconfig threshold that is lower than the default UL-SCell-deconfig threshold. Whereas, if the UE is a standard-power UE, then the access node may responsively switch to apply an UL-SCell-deconfig threshold that is higher than the default UL-SCell-deconfig threshold.

Further, in another respect, the access node could dynamically vary the UL-SCell-deconfig threshold that the access node applies, with the dynamic varying being based on an evaluation of the access node's uplink spectral efficiency. Here, for instance, the access node could be configured with an uplink-spectral-efficiency set point that defines an optimal desired level of uplink spectral efficiency. Further, the access node could be set with an initial UL-SCell-deconfig threshold to apply generally (e.g., as a default UL-SCell-deconfig threshold for use when serving UEs). And the access node could then regularly evaluate its actual uplink spectral efficiency and could dynamically adjust the UL- SCell-deconfig threshold, or select an UL-SCell-deconfig threshold to apply, based on the current level of its uplink spectral efficiency.

With this implementation, the access node could measure its uplink spectral efficiency over a sliding window of time, generally across the multiple carriers on which the access node is configured to operate. And the access node could regularly compare its latest measure of uplink spectral efficiency with its uplink-spectral-efficiency set point.

If and when the access node thereby determines that its uplink spectral efficiency is less than its uplink-spectral-efficiency set point, the access node could responsively increase its UL-SCell-deconfig threshold or select a higher UL-SCell-deconfig threshold to apply. The access node could then apply the increased UL-SCell-deconfig threshold, which may result in the access node more readily releasing UEs' SCells and may thereby help reduce the extent to which UEs will face the MCS-reduction noted above. Reducing the extent of MCS reduction may in turn help increase the access node's uplink spectral efficiency, approaching the uplink-spectral-efficiency set point.

Whereas, if and when the access node thereby determines that its uplink spectral efficiency is greater than its uplink-spectral-efficiency set point, the access node could responsively decrease its UL-SCell-deconfig threshold or select a lower UL-SCell-deconfig threshold to apply. The access node could then apply the decreased UL-SCell-deconfig threshold, which may result in the access node less readily releasing UEs' SCells and may thereby increase the extent to which UEs will face the MCS-reduction noted above. Increasing the extent of MCS reduction may in turn help decrease the access node's uplink spectral efficiency, likewise approaching the uplink-spectral-efficiency set point.

These as well as other aspects, advantages, and alternatives will become additionally apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

Referring to the drawings, as noted above, FIG. 1 is a simplified block diagram of an example wireless communication system in which various disclosed features can be implemented. It should be understood, however, that numerous variations from this and other disclosed arrangements and operations are possible. For example, elements or operations could be added, removed, combined, distributed, re-ordered, or otherwise modified. In addition, operations described as being performed by one or more entities could be implemented in various ways, such as by a processor executing instructions stored in non-transitory data storage, along with associated circuitry or other hardware, for instance.

Figure 1:
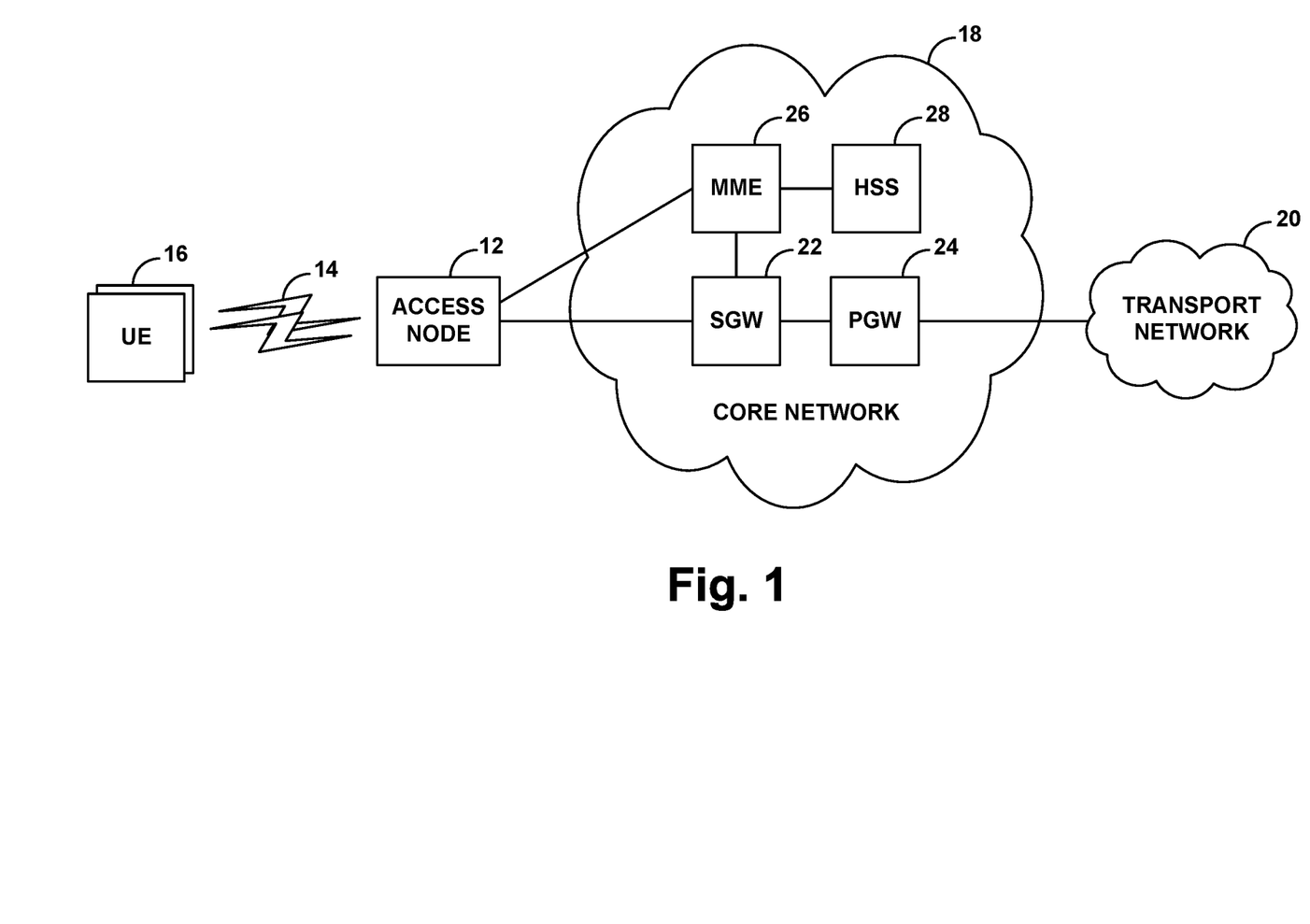
FIG. 1 is a simplified block diagram of a network arrangement in which aspects of the present disclosure can be implemented.

As shown in FIG. 1, the example wireless communication system includes a representative access node 12 that is configured to provide service on multiple carriers 14, each of which could be FDD or TDD and therefore include separate downlink and uplink channels or a shared channel multiplexed over time for downlink and uplink use. Shown operating within coverage of the access node are then a plurality of UEs 16, which could be devices of the type discussed above, among other possibilities.

The access node 12 could be a macro access node of the type configured to provide a wide range of coverage, with an antenna structure mounted on a tower or other tall structure. Alternatively, the access node could take other forms, such as a small cell access node, a repeater, a femtocell access node, or the like, which might be configured to provide a smaller range of coverage. The access node could be configured to operate according to any of the radio access technologies described above, among other possibilities.

The access node is shown coupled with a core network 18, which could be an enhanced packet core (EPC) network, a next generation core (NGC) network, or another network including components that support an applicable radio access technology and that may provide connectivity with at least one transport network 20, such as the Internet.

In an example implementation as shown, the core network 18 includes a serving gateway (SGW) 22, a packet data network gateway (PGW) 24, a mobility management entity (MME) 26, and a home subscriber server (HSS) 28. In particular, the access node 12 has an interface with the SGW 22, the SGW 22 has an interface with the PGW 24, and the PGW 24 provides connectivity with the transport network 20. Further, the access node 12 has an interface with the MME 26, and the MME 26 has interfaces with the SGW 22 and the HSS 28. These various interfaces could be virtual packet tunnels defined within the core network.

With this arrangement, the SGW and PGW cooperatively provide user-plane connectivity between the access node 12 and the transport network 20, to enable a UE served by the access node to engage in communication on the transport network. And the MME 26 operates as a controller to carry out operations such as coordinating UE attachment and setup of user-plane bearers. Further, the HSS 28 includes or has access to a data store containing UE capabilities and service profile data and may work with the MME 26 to facilitate UE authentication.

As discussed above, the air interface on each of the access node's carriers 14 could be structured to define various air-interface resources.

For instance, in the time domain, the air interface could define a continuum of 10-millisecond (ms) frames, each divided into ten 1-ms subframes, and each subframe could be further divided into a number of timeslots, each additionally divided into symbol time segments. And in the frequency domain, the carrier bandwidth could be divided into subcarriers with specified subcarrier spacing on the order of 15 to 240 kHz. With this arrangement, the air interface on each carrier would define the above-noted array of resource elements each occupying a subcarrier and symbol time segment, and the access node 12 and UEs could communicate with each other through modulation of the subcarriers to carry data in those resource elements. Variations of this arrangement are possible as well.

Further, particular groupings of resource elements on the air interface of each carrier could be grouped together to define the PRBs discussed above. In an example implementation, each PRB could span one timeslot in the time domain and a group of subcarriers in the frequency domain. Depending on the carrier bandwidth, the air interface could thus support a certain number of such PRBs across the bandwidth of the carrier within each timeslot or within each subframe. Further, certain resource elements or PRBs could be reserved for use to carry particular types of data, such as control signaling and/or user-plane communications as noted above.

In line with the discussion above, when a UE enters into coverage of the access node, the UE could detect coverage of the access node on a particular carrier. And the UE could then engage in random access signaling and RRC signaling with the access node 12 to connect with the access node on the carrier, thus putting the UE in an RRC-connected mode.

Once the UE is connected with the access node 12, the UE could then transmit to the access node an attach request, which the access node could forward to the MME 26 for processing. After working with the HSS 28 to authenticate the UE, the MME 26 could coordinate setup for the UE of one or more user-plane bearers, to enable the UE to engage in communication on the transport network 20. And the access node could establish for the UE a context record indicating operational state of the UE, including an indication of the carrier on which the UE is connected and an indication of each user-plane bearer that is configured for the UE. Further, the access node could receive from the UE and/or the HSS (via the MME) a set of capabilities, configuration, and profile data for the UE and could store that data in the context record for reference while serving the UE.

Each user-plane bearer that the MME 26 configures for the UE could have a respective quality-of-service class level, having a corresponding quality-of-service class indicator (QCI) value that is associated with the type of communication the bearer would carry, and the access node might record that QCI value in the UE's context record. By default, the MME may set up for the UE a best-efforts bearer (QCI 9) for use to carry general Internet communications such as web-browsing traffic, messaging traffic, or the like. Further, initially or in response to other signaling from the UE or other entities indicating that the UE will engage in a particular type of communication, the MME might set up one or more other appropriate bearers for the UE, such as a QCI 2 bearer for use to carry conversational video communications, a QCI 3 bearer for use to carry real-time gaming traffic, and/or a QCI 7 bearer to carry live video streaming traffic, among other possibilities.

As discussed above, once the UE is connected with the access node on a carrier and has one or more established bearers, the access node could then serve the UE with wireless data communications. For instance, as discussed above, when the UE has data to transmit, the UE could transmit to the access node a scheduling request, including a BSR and PHR. And the access node could then allocate one or more uplink PRBs in an upcoming subframe for carrying a transport block of data from the UE and could transmit to the UE a DCI message that designates those upcoming PRBs. The UE could then accordingly transmit the transport block to the access node in the designated PRBs.

Further, as noted above, while the access node is serving the UE, the UE could report to the access node periodically and/or within the UE's scheduling requests or other signaling an indication of the UE's determined channel quality, such as CQI or RSRP for instance. And as noted above, the access node could use that channel quality report, possibly together with the UE's PHR or other information, as a basis to the MCS that the access node may designate in its uplink scheduling directives to the UE.

In addition, initially upon UE connection or subsequently while the access node is serving the UE on a carrier, the access node could configure uplink carrier-aggregation service for the UE.

To invoke uplink carrier aggregation service for the UE, the access node could first engage in RRC signaling with the UE to cause the UE to scan for coverage on the access node's carriers 14 and to report threshold strong coverage on a given such other carrier. The access node could then add at least the uplink channel of that other carrier to the UE's connection, designating one of the UE's serving carriers as the UE's PCell and designating another of the UE's serving carriers as the UE's SCell for an example 2CA implementation. For instance, the access node could update the UE's context record to indicate that the access node is now serving the UE with uplink carrier aggregation on the uplink channels of the PCell and the SCell. And the access node could engage in RRC signaling with the UE to inform the UE that the access node is now serving the UE with uplink carrier aggregation on those two uplink channels.

With uplink carrier aggregation so configured, the access node could then serve the UE accordingly. In line with the discussion above, when the UE has data to transmit, the UE could send a scheduling request (e.g., with BSR, CQI, and PHR) on the UE's PCell. The access node could then allocate a uplink PRBs distributed across the uplink channels in an upcoming subframe to carry the data from the UE to the access node. And the access node could transmit to the UE a DCI specifying a set of PRBs respectively on each of the uplink channels on which the UE should transmit the data, and specifying an MCS for the UE to use for the transmission. The UE could then accordingly transmit the data to the access node concurrently on a set of PRBs on the UE's PCell and a set of PRBs on the UE's SCell.

In practice, the access node may serve multiple UEs 16 concurrently, each with either single-uplink-carrier service or uplink-carrier-aggregation service, possibly on various ones or combinations of the access node's carriers 14. On a given carrier, the access node could therefore apply a scheduling algorithm that seeks to fairly allocate the limited number of uplink PRBs of the carrier among the various served UEs, to enable each UE to engage in uplink communication as appropriate.

Further, as discussed above, when the access node is serving a given UE with uplink carrier aggregation, the access node could automatically deconfigure an uplink SCell of a UE's connection if and when the UE reports threshold poor channel quality, namely, channel quality that is at least as poor as an UL-SCell-deconfig threshold. If the UE is served with uplink carrier aggregation on just two carrier's uplink channels (i.e., uplink 2CA), this could involve deconfiguring the single uplink SCell of the UE's connection. Whereas, if the UE is served with uplink carrier aggregation on more than two carriers' uplink channels (e.g., uplink 3CA or greater), this could involve deconfiguring all of the UE's uplink SCells or perhaps deconfiguring just one or another proper subset of the UE's uplink SCells.

The UL-SCell-deconfig threshold could vary based on the type of UE channel quality metric used. For instance, if the UE channel quality metric is RSRP, then the UL-SCell-deconfig metric might be an RSRP value deemed sufficiently low to justify deconfiguring the UE's uplink SCell. Examples of such RSRP threshold values might be in the range of −110 dBm to −85 dBm, among other possibilities. Whereas if the UE channel quality metric is QCI, then the UL-SCell-deconfig metric might be a QCI value deemed likewise sufficiently low to justify deconfiguring the UE's uplink SCell.

Deconfiguring the UE's uplink SCell could involve reconfiguring the UE's RRC connection to operatively remove the uplink SCell from the connection.

Operatively removing the uplink SCell from the UE's connection could involve setting the access node to stop allocating uplink PRBs of that SCell to the UE. The access node could update the UE's context record to indicate this and perhaps signal accordingly to the UE, and the access node would then accordingly not allocate uplink PRBs of that SCell for use by the UE, rather allocating to the UE uplink PRBs of just the UE's PCell (and perhaps any other non-deconfigured SCell).

Further, where feasible, operatively removing the uplink SCell from the UE's connection could involve actually removing the uplink channel of the SCell from the UE's connection. For instance, if the UE's connection encompasses an FDD SCell that includes separate downlink and uplink frequency channels, this could involve the access node removing from the connection the uplink channel of that SCell and leaving in the connection the downlink channel of the SCell, or removing the SCell altogether from the UE's connection. Here too, the access node could update the UE's context record to indicate and could signal accordingly to the UE. And the access node could then proceed to serve the UE on the frequency channels remaining in the UE's connection.

In line with the discussion above, the access node 12 in an example implementation will dynamically set (e.g., select, adjust, or otherwise configure) the UL-SCell-deconfig threshold based upon operational circumstances (e.g., one or more such circumstances) and/or an evaluation of the access node's spectral efficiency.

As to operational circumstances, as discussed above, the access node could dynamically set the UL-SCell-deconfig threshold to apply for a given UE, with the setting being based on the type of communication in which the UE is engaged, such as whether the type of communication is uplink heavy or rather uplink light.

As discussed above if the access node determines that the communication type is uplink heavy, then, based at least in part on that determination, the access node could responsively apply a lower UL-SCell-deconfig threshold (e.g., on the order of −100 dBm to −95 dBm). Whereas, if the access node determines that the communication type is uplink light, then the access node could responsively apply a higher UL-SCell-deconfig threshold (e.g., on the order of −90 dBm to −85 dBm).

The type of communication in which the UE is engaged could be the type of communication in which the UE is currently engaged or the type of communication in which the UE is about to be engaged, among other possibilities. The access node could determine the type of communication in which the UE is engaged in various ways. By way of example, the access node could deduce the type of communication based on the QCI level of a bearer currently established for the UE, or by evaluating (e.g., with deep-packet inspection) communication-session setup signaling that passes to or from the UE via the access node and that indicates the type of communication, among other possibilities.

The access node could then be configured with mapping data (e.g., a table or other data structure, and/or associated program logic) that maps particular types of communications with corresponding indications of how uplink-heavy or uplink-light the type of communication tends to be. That way, upon determining a type of communication in which the UE is engaged, the access node could refer to that mapping data to determine whether the type of communication is uplink heavy or rather uplink light. And the access node could accordingly select an UL-SCell-deconfig threshold to apply for the UE.

Alternatively, the access node could be configured with mapping data that maps particular types of communications directly with corresponding UL-SCell-deconfig thresholds to apply, with the mappings possibly being established based on engineering input in view of uplink heaviness or lightness and/or one or more other factors. Upon determining the type of communication in which the UE is engaged, the access node could then refer to this mapping data to directly determiner what UL-SCell-deconfig threshold to apply, and the access node could apply that UL-SCell-deconfig threshold for the UE.

Still alternatively, the access node could determine whether the UE is engaged in uplink heavy or uplink light communication by monitoring the actual extent of uplink communication from the UE, such as the actual rate of uplink communication from the UE per unit time over a recent sliding window. That actual extent of uplink communication from the UE may be uplink-heavy communication, which could lead the access node to apply a lower UL-SCell-deconfig threshold, or uplink-light communication, which could lead the access node to apply a higher UL-SCell-deconfig threshold.

Note also that, through these or other techniques, the access node could select an UL-SCell-deconfig threshold from a range of UL-SCell-deconfig thresholds based on how heavy or how light the UE's communication is. For instance, if the access node determines that the UE's uplink communication is very heavy, then the access node might select an UL-SCell-deconfig threshold of −100 dBm; if the access node determines that the UE's uplink communication is somewhat heavy, then the access node might select an UL-SCell-deconfig threshold of −95 dBm; if the access node determines that the UE's uplink communication is somewhat light, then the access node might select an UL-SCell-deconfig threshold of −90 dBm; and if the access node determines that the UE's uplink communication is very light, then the access node might select an UL-SCell-deconfig threshold of −85 dBm.

Alternatively or additionally as to operational circumstances, as also discussed above, the access node could dynamically set the UL-SCell-deconfig threshold to apply for a given UE, with the setting being based on the power class of the UE, such as whether the UE is a standard-power UE or rather a high-power UE.

In practice, the UE's capabilities, configuration, and/or profile data that the access node obtains and stores in the UE's context record might indicate the UE's power class. The access node could therefore refer to that data to determine the UE's power class and could set the UL-SCell-deconfig to apply for the UE based on that determined power class.

In an example implementation, the access node could be configured with mapping data (e.g., a table or other data structure, and/or associated program logic) that maps particular UE power classes to particular UL-SCell-deconfig thresholds. For instance, the mapping data could specify that, if the UE is a standard-power UE, then the access node should apply a UL-SCell-deconfig threshold of −85 dBm to −90 dBm. And the mapping data could specify that, if the UE is a high-power UE, then the access node should apply a UL-SCell-deconfig threshold of −95 dBm to −100 dBm. Upon determining the UE's power class, the access node could thus refer to that data to determine a corresponding UL-SCell-deconfig threshold to apply and could proceed to apply that UL-SCell-deconfig threshold for the UE.

As further noted above, the access node could carry out this dynamic setting of UL-SCell-deconfig to apply for a particular UE in a scenario where the access node is set to apply a default UL-SCell-deconfig threshold and the access node then transitions to apply a different UL-SCell-deconfig threshold on one or more of these bases. For instance, based at least in part on a determination that the UE is engaged in a threshold heavy uplink communication, the access node could transition from applying the default UL-SCell-deconfig threshold to applying a lower UL-SCell-deconfig threshold. Or based at least in part on a determination that the UE is a high-power UE rather than a standard-power UE, the access node could transition from applying the default UL-SCell-deconfig threshold to applying a lower UL-SCell-deconfig threshold. Other examples are possible as well.

Alternatively or additionally, as to spectral efficiency, as discussed above, the access node could dynamically vary a UL-SCell-deconfig threshold that the access node generally applies for its served UEs (e.g., as the default UL-SCell-deconfig threshold noted above) based on an evaluation of the access node's uplink spectral efficiency. In practice, for instance, the access node could periodically carry out this process, to adjust the UL-SCell-deconfig threshold in an effort to achieve a desired level of uplink spectral efficiency.

As noted above, for this implementation, the access node could be configured with an uplink-spectral-efficiency set point against which the access node would compare its current level of uplink spectral efficiency. An example uplink-spectral-efficiency set point could be 5 megabits/second/Hertz (Mbps/Hz), but other values could be set by engineering design.

The access node could then track its uplink spectral efficiency cooperatively across the uplink channels of the access nodes various carriers 14. For instance, the access node could determine the quantity of data that is communicated per second cooperatively across the access node's various uplink channels and could divide that data rate by the sum total of the uplink channels' bandwidth, to compute the access node's uplink spectral efficiency.

In line with the discussion above, dynamically adjusting the UL-SCell-deconfig threshold based on uplink spectral efficiency could begin with the access node being set to apply an initial UL-SCell-deconfig threshold. This initial UL-SCell-deconfig threshold could be the UL-SCell-deconfig threshold that the access node is set to apply at any given time that this process may apply.

For each of one or more times that the access node determines the access node's actual uplink spectral efficiency, the access node could then compare that determined uplink spectral efficiency with the uplink-spectral-efficiency set point and, based on the comparison, could then adjust the UL-SCell-deconfig threshold. Namely, as discussed above, if and when the access node determines that its actual uplink spectral efficiency is lower than the uplink-spectral-efficiency set point, the access node could responsively increase the UL-SCell-deconfig threshold that the access node applies generally for its served UEs. Whereas if and when the access node determines that its actual uplink spectral efficiency is higher than the uplink-spectral-efficiency set point, the access node could responsively decrease the UL-SCell-deconfig threshold that the access node applies generally for its served UEs.

Each incremental change that the access node makes to the UL-SCell-deconfig threshold in this process could be by a set amount (e.g., by 0.5 dBm or 1 dBm). Alternatively, the access node could set the magnitude of the incremental change based on the magnitude of the difference between the access node's determined uplink spectral efficiency and the uplink-spectral-efficiency set point. For instance, for a small difference, the access node might make a small incremental change (e.g., about 0.5 dBm), whereas for a larger difference, the access node might make a larger incremental change (e.g. about 2 dBm). Other examples are possible as well.

Applying this process iteratively, the access node could thus learn what UL-SCell-deconfig threshold could help achieve a desired level of spectral efficiency when applied for UEs served by the access node. By way of example, if a lot of UEs served by the access node engage in uplink heavy communication, and if the UL-SCell-deconfig threshold is too high, those UEs may tend to face reduced-order MCS, and so the access node's overall uplink spectral efficiency may be lower. Through this iterative process, that lower uplink spectral efficiency may result in increasing the UL-SCell-deconfig threshold, which may in turn result in more readily deconfiguring the uplink SCell of the served UEs, thereby helping to decrease the extent of MCS-reduction, which may in turn increase the access node's uplink spectral efficiency.

Figure 2:
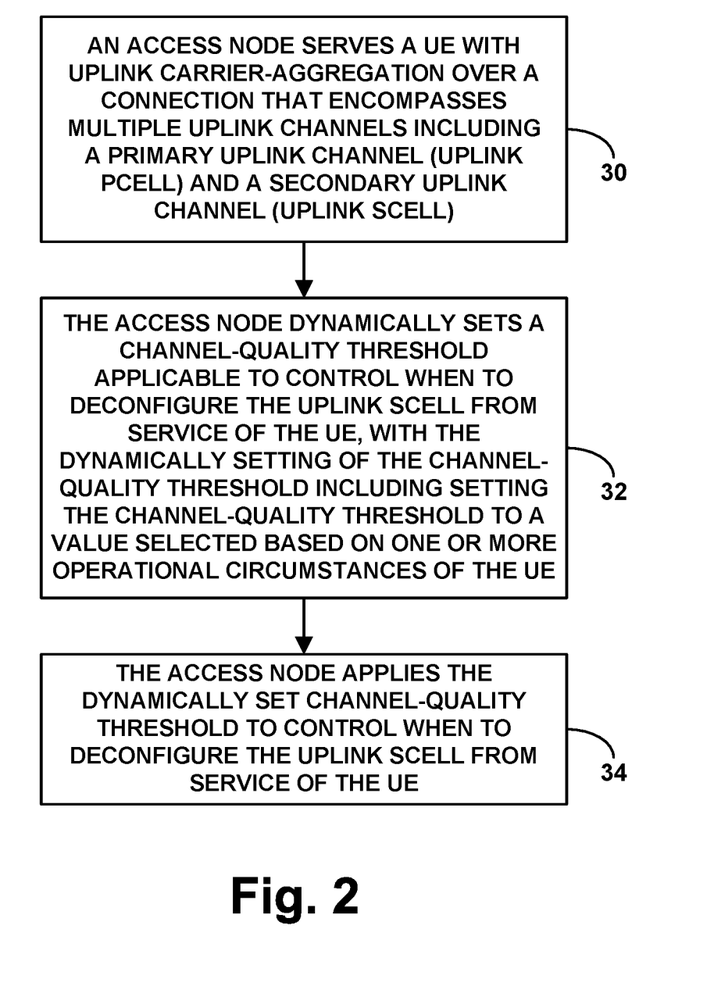
FIG. 2 is a flow chart depicting a method that can be carried out in accordance with the disclosure.

FIG. 2 is next a flow chart depicting a method that could be carried out in line with the discussion above, to help control uplink carrier-aggregation service with an UL-SCell-deconfig threshold to be applied for a given UE being set based on one or more operational circumstances of the UE. Features of this method could be carried out by the access node itself or by one or more other entities operating on behalf of the access node, among other possibilities.

As shown in FIG. 2, at block 30, the method includes the access node serving the UE with uplink carrier-aggregation over a connection that encompasses multiple uplink channels including a primary uplink channel (uplink PCell) and a secondary uplink channel (uplink SCell). At block 32, the method includes the access node dynamically setting a channel-quality threshold (e.g., UL-SCell-deconfig) applicable to control when to deconfigure the uplink SCell from service of the UE, with the dynamically setting of the channel-quality threshold including setting the channel-quality threshold to a value selected based on one or more operational circumstances of the UE. And at block 34, the method includes the access node applying the dynamically set channel-quality threshold to control when to deconfigure the uplink SCell from service of the UE.

In line with the discussion above, the channel-quality threshold in this method could be a downlink channel quality value, such as RSRP, CQI, or the like. And the act of applying the dynamically set channel-quality threshold to control when to deconfigure the uplink SCell from service of the UE could involve (i) receiving from the UE a report of downlink channel quality, (ii) making a determination of whether the reported downlink channel quality is at least as low as the dynamically set channel-quality threshold, and (iii) responsive to the determination being affirmative, deconfiguring the uplink SCell from service of the UE.

As discussed above, the act of setting the channel-quality threshold to the value selected based on one or more operational circumstances of the UE could involve setting the channel-quality threshold to a value selected based on a type of communication in which the UE engages. For instance, this could involve (i) making a determination of whether the type of communication is uplink-heavy or rather uplink-light, (ii) if the determination is that the type of communication is uplink-heavy rather than uplink-light, then, based on the determination, selecting as the channel-quality threshold a first channel-quality threshold rather than a second channel-quality threshold based on the first channel-quality threshold being lower than the second channel-quality threshold, and (iii) if the determination is that the type of communication is uplink-light rather than uplink-heavy, then, based on the determination, selecting as the channel-quality threshold the second channel-quality threshold rather than a first channel-quality threshold based on the second channel-quality threshold being higher than the first channel-quality threshold.

Further, as discussed above, the act of setting the channel-quality threshold to the value selected based on the type of communication in which the UE engages comprises (i) operating with the channel-quality threshold set to a default (e.g., initially set) value, (ii) making a determination of whether the type of communication is uplink-heavy rather than uplink-light, and (iii) responsive to the determination being affirmative, transitioning from operating with the channel-quality threshold set to the default value to operating instead with the channel-quality threshold set to a value lower than the default value.

Alternatively or additionally, as discussed above, the act of setting the channel-quality threshold to the value selected based on one or more operational circumstances of the UE could involve setting the channel-quality threshold to a value selected based on a power class of the UE. Here, for instance, the power class of the UE could define a maximum transmission power of the UE and could be (i) standard-power or (ii) high-power, with high-power defining a higher maximum transmission power than the standard-power.

In that case, the act of setting the channel-quality threshold to a value selected based on the power class of the UE could involve (i) making a determination of whether the power class of the UE is standard-power or rather high-power, (ii) if the determination is that the power class of the UE is standard-power rather than high-power, then, based on the determination, setting the channel-quality threshold to a first value rather than a second value based first value being higher than the second value, and (iii) if the determination is that the power class of the UE is high-power rather than standard-power, then, based on the determination, setting the channel-quality threshold to the second value rather than the firs value based second value being lower than the first value.

Further, the act of setting the channel-quality threshold to a value selected based on the power class of the UE could involve (i) operating with the channel-quality threshold set to a default value (e.g., initial value), (ii) making a determination that the power class of the UE is high-power, and (iii) responsive to the determination, transitioning from operating with the channel-quality threshold set to the default value to operating instead with the channel-quality threshold set to a value lower than the default value.

Figure 3:
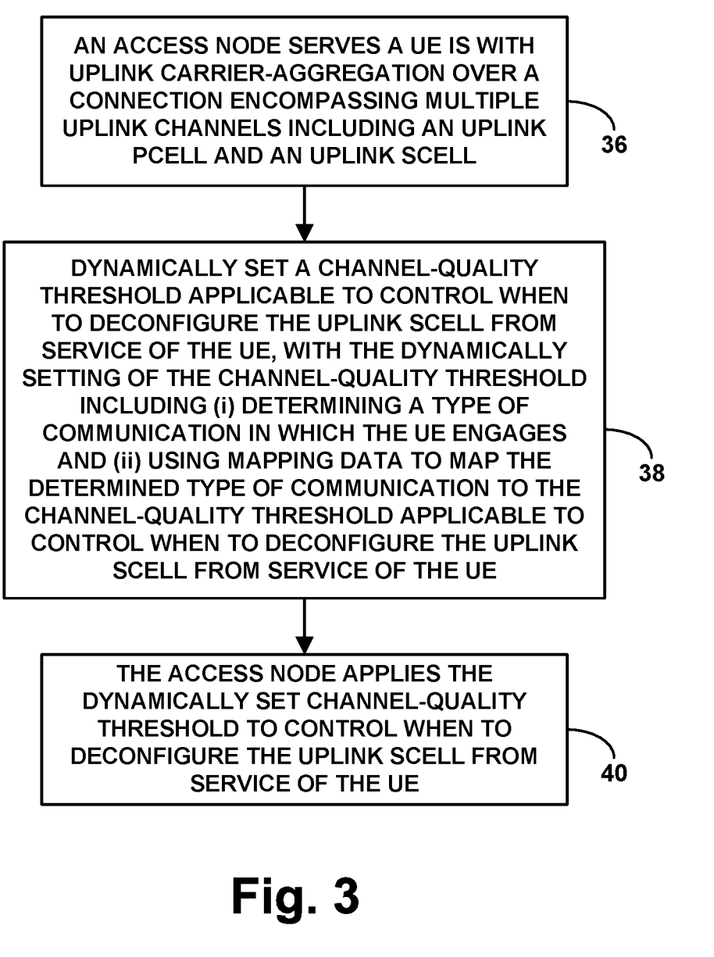
FIG. 3 is another flow chart depicting a method that can be carried out in accordance with the disclosure.

FIG. 3 is another flow chart depicting a method that could be carried out in line with the with the discussion above, to help control uplink carrier-aggregation service with an UL-SCell-deconfig threshold to be applied for a given UE being set based on the type of communication in which the UE is engaged. Here too, features of this method could be carried out by the access node itself or by one or more other entities operating on behalf of the access node, among other possibilities.

As shown in FIG. 3, at block 36, the method includes the access node serving a UE is with uplink carrier-aggregation over a connection encompassing multiple uplink channels including an uplink PCell and an uplink SCell. At block 38, the method further includes dynamically setting a channel-quality threshold (e.g., UL-SCell-deconfig) applicable to control when to deconfigure the uplink SCell from service of the UE, with the dynamically setting of the channel-quality threshold including (i) determining a type of communication in which the UE engages and (ii) using mapping data to map the determined type of communication to the channel-quality threshold applicable to control when to deconfigure the uplink SCell from service of the UE. And at block 40, the method includes the access node applying the dynamically set channel-quality threshold to control when to deconfigure the uplink SCell from service of the UE.

Various features discussed above can be applied in this context as well, and vice versa.

Figure 4:
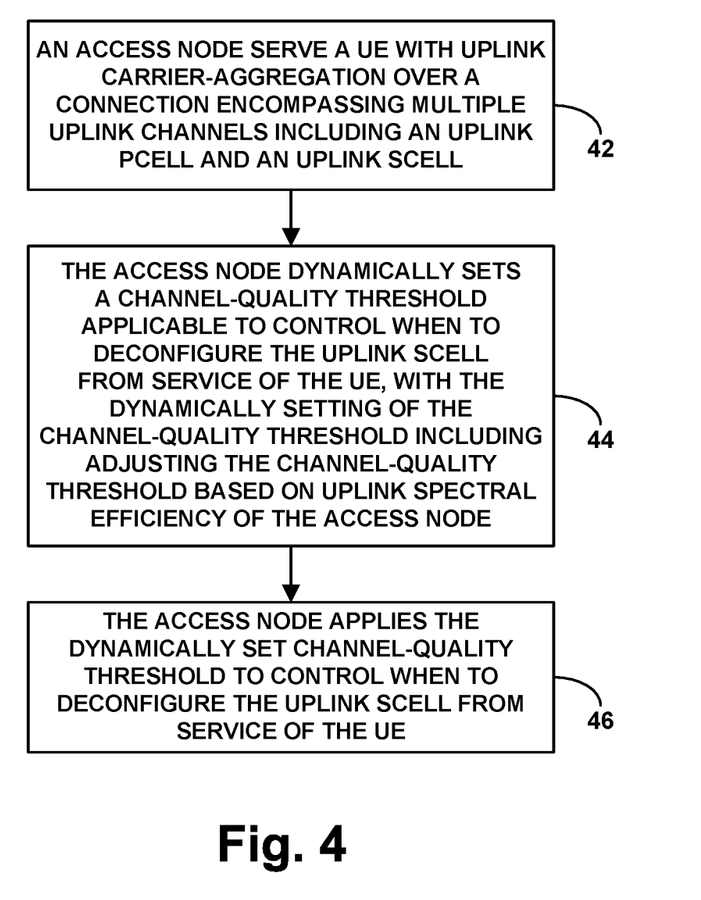
FIG. 4 is another flow chart depicting a method that can be carried out in accordance with the disclosure.

FIG. 4 is next a flow chart depicting a method that could be carried out in line with the discussion above, to help control uplink carrier-aggregation service with an UL-SCell-deconfig threshold to be applied generally by the access node being dynamically set based on uplink spectral efficiency of the access node. Here too, features of this method could be carried out by the access node itself or by one or more other entities operating on behalf of the access node, among other possibilities.

As shown in FIG. 4, at block 42, the method includes the access node serving the UE with uplink carrier-aggregation over a connection encompassing multiple uplink channels including an uplink PCell and an uplink SCell. Further, at block 44, the method includes the access node dynamically setting a channel-quality threshold (e.g., UL-SCell-deconfig) applicable to control when to deconfigure the uplink SCell from service of the UE, with the dynamically setting of the channel-quality threshold including adjusting the channel-quality threshold based on uplink spectral efficiency of the access node. And at block 46, the method includes the access node applying the dynamically set channel-quality threshold to control when to deconfigure the uplink SCell from service of the UE.

In line with the discussion above, as in the implementations above, the channel-quality threshold in this method could be a downlink channel quality value (e.g., RSRP or CQI, among other possibilities). And the act of applying the dynamically set channel-quality threshold to control when to deconfigure the uplink SCell from service of the UE could involve (i) receiving from the UE a report of downlink channel quality, (ii) making a determination of whether the reported downlink channel quality is at least as low as the dynamically set channel-quality threshold, and (iii) responsive to the determination being affirmative, deconfiguring the uplink SCell from service of the UE.

Further, as discussed above, the act of adjusting the channel-quality threshold based on uplink spectral efficiency of the access node could involve iteratively (i) computing uplink spectral efficiency of the access node (perhaps cooperatively across multiple carriers on which the access node is configured to operate), (ii) comparing the computed uplink spectral efficiency of the access node with an uplink-spectral-efficiency set point, (iii) based on the comparing, adjusting the channel-quality threshold.

And in this iterative process, the act of adjusting the channel-quality threshold based on the comparing could involve (i) making a determination, based on the comparing, of whether the computed uplink spectral efficiency of the access node is greater than or less than the uplink-spectral-efficiency set point, (ii) if the determination is that the computed uplink spectral efficiency of the access node is greater than the uplink-spectral-efficiency set point, then, based on the determination, decreasing the channel-quality threshold, and (iii) if the determination is that the computed uplink spectral efficiency of the access node is less than the uplink-spectral-efficiency, then, based on the determination, increasing the channel-quality threshold. And the act of iteratively adjusting of the channel-quality threshold could start with an initial channel-quality threshold value.

Still further, as discussed above, the method could include the access node applying the dynamically configured channel-quality threshold for each of a plurality of UEs that the access node serves with uplink carrier aggregation.

Various features discussed above can be applied in this context as well, and vice versa.

Figure 5:
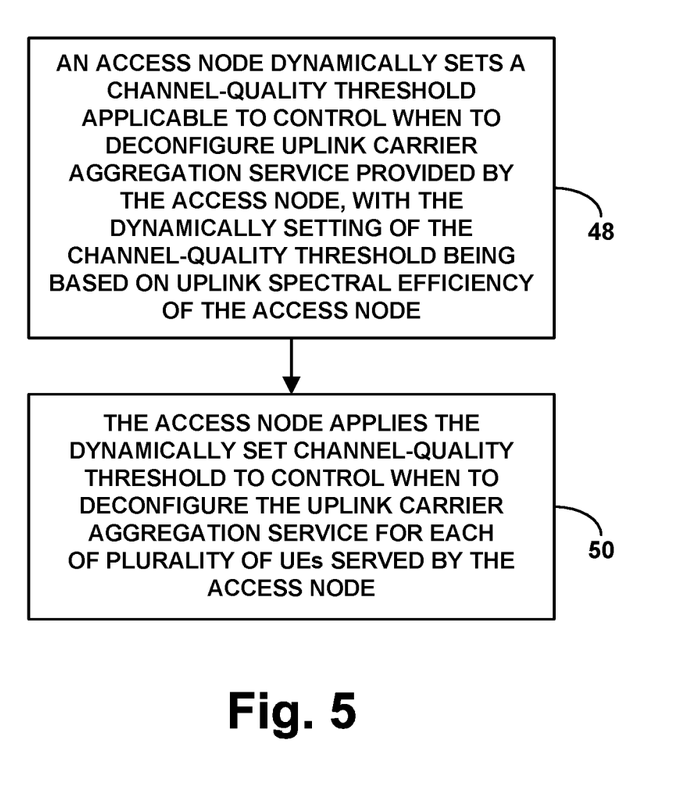
FIG. 5 is another flow chart depicting a method that can be carried out in accordance with the disclosure.

FIG. 5 is next a flow chart depicting a method that could be carried out in line with the discussion above, to help control wireless communication service by an access node. Here too, features of this method could be carried out by the access node itself or by one or more other entities operating on behalf of the access node, among other possibilities.

As shown in FIG. 5, at block 48, the method includes the access node dynamically setting a channel-quality threshold (e.g., UL-SCell-deconfig) applicable to control when to deconfigure uplink carrier aggregation service provided by the access node, with the dynamically setting of the channel-quality threshold being based on uplink spectral efficiency of the access node. And at block 50, the method includes the access node applying the dynamically set channel-quality threshold to control when to deconfigure the uplink carrier aggregation service for each of plurality of UEs served by the access node.

Various features discussed above can be applied in this context as well, and vice versa.

Figure 6:
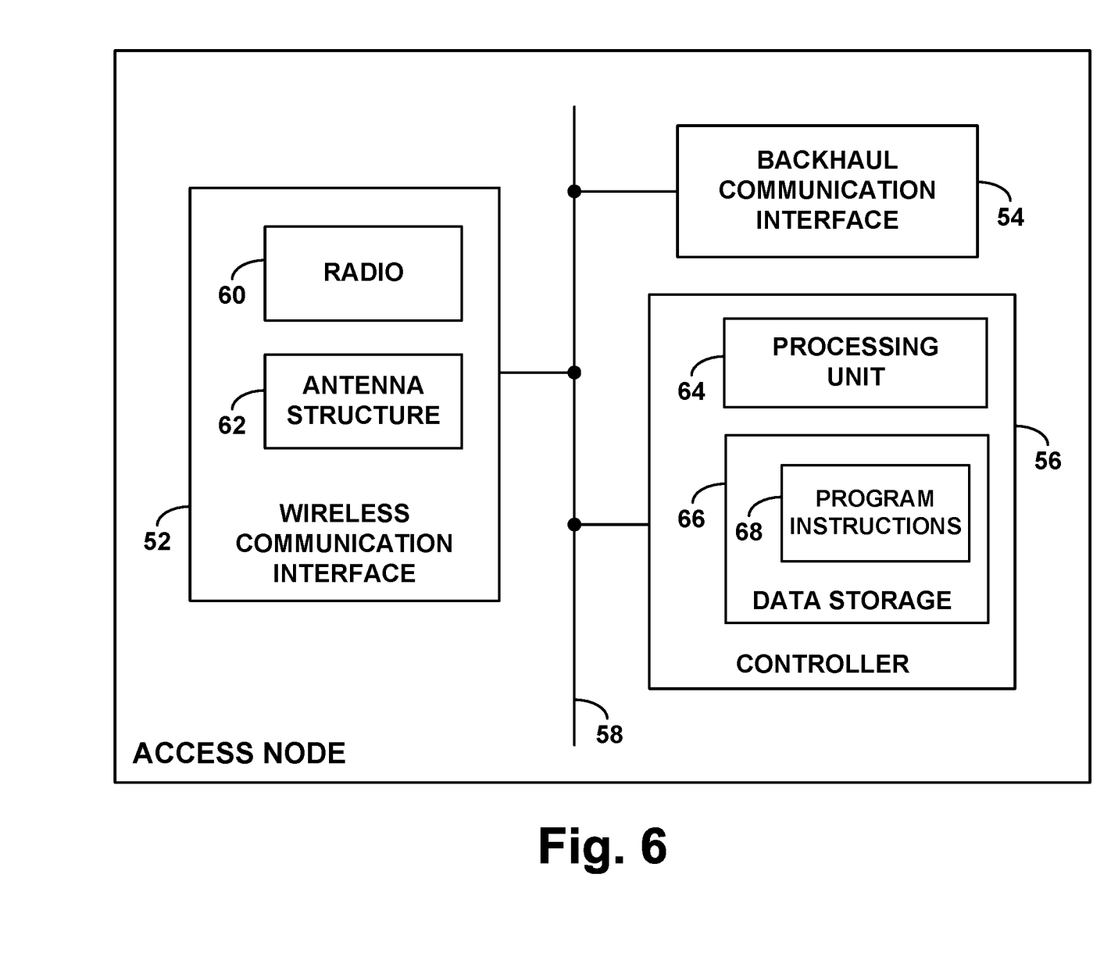
FIG. 6 is a simplified block diagram of an access node operable in accordance with the disclosure.

Finally, FIG. 6 is a simplified block diagram of an access node that could carry out various features described herein. As shown in FIG. 5, the example access node includes a wireless communication interface 52, a backhaul communication interface 54, and a controller 56, all of which could be integrated together and/or communicatively linked by a network, system bus, or other connection mechanism 58.

Wireless communication interface 52 includes a radio 60 and antenna structure 62, among other components, cooperatively enabling the access node to provide wireless service on a plurality of carriers. For instance, the radio could operate to interface between RF signals and baseband signals. And the antenna structure 62 could comprise a plurality of antennas (e.g., an antenna array) through which the access node communicates over the air interface.

Backhaul communication interface 54 could be a network communication interface (e.g., an Ethernet network interface port and/or connection) through which the access node can communicate with various other network entities, such as entities on a core network for instance.

And controller 56, which could comprise a processing unit 64 (e.g., one or more microprocessors or other processors), data storage 66 (e.g., one or more volatile and/or non-volatile storage units, such as magnetic, optical or flash storage), and program instructions 68 stored in the data storage and executable by the processing unit, or could take other forms, could be operable to cause carry out various operations as described herein, thus causing the access node to carry out the various operations.

In line with the discussion above, for instance, the controller be configured to control service of a user equipment device (UE) when the UE is served by the access node with uplink carrier-aggregation over a connection encompassing multiple uplink channels including an uplink PCell and an uplink SCell. By way of example, the controller could be configured to dynamically set a channel-quality threshold applicable to control when to deconfigure the uplink SCell from service of the UE, and to apply the dynamically set channel-quality threshold to control when to deconfigure the uplink SCell from service of the UE.

As discussed above, the act of dynamically setting of the channel-quality threshold could include setting the channel-quality threshold to a value selected based on one or more operational circumstances of the UE, such as based on the type of communication in which the UE engages or based on a power class of the UE. For instance, the controller could be configured to determine a type of communication in which the UE engages and to use mapping data to map the determined type of communication to the channel-quality threshold applicable to control when to deconfigure the uplink SCell from service of the UE.

And as further discussed above, the act of dynamically setting the a channel-quality threshold could involve adjusting the channel-quality threshold based on uplink spectral efficiency of the access node. For instance, the controller could be configured to iteratively (i) compute uplink spectral efficiency of the access node, (ii) compare the computed uplink spectral efficiency of the access node with an uplink-spectral-efficiency set point, (iii) based on the comparing, adjust the channel-quality threshold.

Various features discussed above can be applied in this context as well, and vice versa.

Exemplary embodiments have been described above. Those skilled in the art will understand, however, that changes and modifications may be made to these embodiments without departing from the true scope and spirit of the invention.

We claim:

1. An access node comprising:
a wireless communication interface including an antenna structure through which to provide wireless service on a plurality of carriers;
a backhaul communication interface through which to communicate on a core network; and
a controller configured to control service of a user equipment device (UE) when the UE is served by the access node with uplink carrier-aggregation over a connection encompassing multiple uplink channels including a primary uplink channel (uplink PCell) and a secondary uplink channel (uplink SCell),
wherein the controller is configured to dynamically set a channel-quality threshold applicable to control when to deconfigure the uplink SCell from service of the UE, wherein dynamically setting the channel-quality threshold comprises adjusting the channel-quality threshold based on uplink spectral efficiency of the access node, wherein adjusting the channel-quality threshold based on the uplink spectral efficiency of the access node comprises (i) computing the uplink spectral efficiency of the access node, (ii) comparing the computed uplink spectral efficiency of the access node with an uplink-spectral-efficiency set point, (iii) making a determination, based on the comparing, of whether the computed uplink spectral efficiency of the access node is greater than or less than the uplink-spectral-efficiency set point, (iv) if the determination is that the computed uplink spectral efficiency of the access node is greater than the uplink-spectral-efficiency set point, then, based on the determination, decreasing the channel-quality threshold, and (v) if the determination is that the computed uplink spectral efficiency of the access node is less than the uplink-spectral-efficiency set point, then, based on the determination, increasing the channel-quality threshold, and wherein the controller is further configured to apply the dynamically set channel-quality threshold to control when to deconfigure the uplink SCell from service of the UE.

2. The access node of claim 1, wherein the controller comprises a processing unit, non-transitory data storage, and program instructions stored in the non-transitory data storage and executable by the processing unit to carry out the dynamically setting and applying.

3. The access node of claim 1, wherein the channel-quality threshold is a downlink channel quality value, wherein applying the dynamically set channel-quality threshold to control when to deconfigure the uplink SCell from service of the UE comprises:

receiving from the UE, through the wireless communication interface, a report of downlink channel quality;

making a determination of whether the reported downlink channel quality is at least as low as the dynamically set channel-quality threshold; and responsive to the determination being affirmative, deconfiguring the uplink SCell from service of the UE.

4. The access node of claim 3, wherein the downlink channel quality comprises downlink reference signal receive power (RSRP).

5. The access node of claim 1, wherein the controller is configured to perform i, ii, iii, iv, and v iteratively.

6. The access node of claim 5, wherein computing the uplink spectral efficiency of the access node comprises computing the uplink spectral efficiency of the access node cooperatively across multiple carriers on which the access node is configured to operate.

7. The access node of claim 5, wherein the iteratively adjusting of the channel-quality threshold starts with an initial channel-quality threshold value.

8. The access node of claim 1, wherein the access node is configured to apply the dynamically configured channel-quality threshold for each of a plurality of UEs that the access node serves with uplink carrier aggregation.

9. A method for controlling wireless service of a user equipment device (UE) by an access node, the method comprising:

serving, by the access node, the UE with uplink carrier-aggregation over a connection encompassing multiple uplink channels including a primary uplink channel (uplink PCell) and a secondary uplink channel (uplink SCell);

dynamically setting, by the access node, a channel-quality threshold applicable to control when to deconfigure the uplink SCell from service of the UE, wherein dynamically setting the channel-quality threshold comprises adjusting the channel-quality threshold based on uplink spectral efficiency of the access node, wherein adjusting the channel-quality threshold based on the uplink spectral efficiency of the access node comprises (i) computing the uplink spectral efficiency of the access node, (ii) comparing the computed uplink spectral efficiency of the access node with an uplink-spectral-efficiency set point, (iii) making a determination, based on the comparing, of whether the computed uplink spectral efficiency of the access node is greater than or less than the uplink-spectral-efficiency set point, (iv) if the determination is that the computed uplink spectral efficiency of the access node is greater than the uplink-spectral-efficiency set point, then, based on the determination, decreasing the channel-quality threshold, and (v) if the determination is that the computed uplink spectral efficiency of the access node is less than the uplink-spectral-efficiency set point, then, based on the determination, increasing the channel-quality threshold; and applying, by the access node, the dynamically set channel-quality threshold to control when to deconfigure the uplink SCell from service of the UE.

10. The method of claim 9, wherein the channel-quality threshold is a downlink channel quality value, wherein applying the dynamically set channel-quality threshold to control when to deconfigure the uplink SCell from service of the UE comprises:

receiving from the UE a report of downlink channel quality;

making a determination of whether the reported downlink channel quality is at least as low as the dynamically set channel-quality threshold; and responsive to the determination being affirmative, deconfiguring the uplink SCell from service of the UE.

11. The method of claim 10, wherein the downlink channel quality comprises downlink reference signal receive power (RSRP).

12. The method of claim 9, further comprising performing i, ii, iii, iv, and v iteratively.

13. The method of claim 12, wherein computing the uplink spectral efficiency of the access node comprises computing the uplink spectral efficiency of the access node cooperatively across multiple carriers on which the access node is configured to operate.

14. The method of claim 12, wherein the iteratively adjusting of the channel-quality threshold starts with an initial channel-quality threshold value.

15. The method of claim 9, further comprising applying, by the access node, the dynamically configured channel-quality threshold for each of a plurality of UEs that the access node serves with uplink carrier aggregation.

16. Non-transitory data storage storing instructions executable by a processor to cause an access node to carry out operations for controlling wireless communication service by the access node, the operations comprising:

dynamically setting a channel-quality threshold applicable to control when to deconfigure uplink carrier aggregation service provided by the access node, wherein the dynamically setting the channel-quality threshold is based on uplink spectral efficiency of the access node, wherein adjusting the channel-quality threshold based on the uplink spectral efficiency of the access node comprises (i) computing the uplink spectral efficiency of the access node, (ii) comparing the computed uplink spectral efficiency of the access node with an uplink-spectral-efficiency set point, (iii) making a determination, based on the comparing, of whether the computed uplink spectral efficiency of the access node is greater than or less than the uplinkspectral-efficiency set point, (iv) if the determination is that the computed uplink spectral efficiency of the access node is greater than the uplink-spectral-efficiency set point, then, based on the determination, decreasing the channel-quality threshold, and (v) if the determination is that the computed uplink spectral efficiency of the access node is less than the uplink-spectral-efficiency set point, then, based on the determination, increasing the channel-quality threshold; and applying the dynamically set channel-quality threshold to control when to deconfigure the uplink carrier aggregation service for each of plurality of user equipment devices served by the access node.

17. The non-transitory data storage of claim 16, wherein the operations further comprise performing i, ii, iii, iv, and v iteratively.

* * * * *